United States Patent Office 2,858,320
Patented Oct. 28, 1958

2,858,320

STABLE HEMATOPORPHYRIN

Marion C. Woods, Niles, and Barbara R. Steigman, Chicago, Ill., assignors to Baxter Laboratories, Inc.

No Drawing. Application April 2, 1956
Serial No. 575,329

2 Claims. (Cl. 260—314)

This invention relates to a new hematoporphyrin product and the method of preparing the same and more particularly, a stable hematoporphyrin readily water reconstitutable to a physiologically acceptable parenteral liquid.

Hematoporphyrin is a purified derivative of hemoglobin and has been shown to be useful in fluoroescing certain human tissues. The hematoporphyrin preferentially accumulates in tissues having a high mitotic index including neoplastic, embryonic, and regenerating tissues and in lymph nodes. Thus, it has been used to delineate cancer tissue in surgery when subjected to ultraviolet radiation. See especially the report of Frank H. J. Figge et al., in the Anatomical Record, vol. 121, No. 2, page 292 (February, 1955). Hematoporphyrin is 1,3,5,8-tetramethyl - 2,4 - di(alphahydroxyethyl) - porphyrin - 6,7,- dipropionic acid, having the empirical formula $$C_{34}H_{38}O_6N_4$$

Hematoporphyrin is commercially available as the solid hydrochloric acid addition salt or as the free base. Conventionally the hydrochloride salt is dissolved in an alkaline aqueous solution, the alkalinity achieved by the use of sodium bicarbonate. The solution is then sterilized and administered intravenously. See Cancer, vol. 8, No. 1 (January-February 1955). The parenteral solution so achieved rapidly loses its ability delineate tissue upon accumulation therein when subjected to ultraviolet radiation. We have found that there is a significant drop in fluorescing ability within a matter of weeks. The importance of having available a hematoporphyrin product that is stable, i. e., of known potency, can be appreciated from the fact that the only known way of testing the quality of hematoporphyrin, other than by administering it, is to subject a solution of it to fluoroescent analysis—a technique cumbersome and unsuited for use immediately before surgery.

The loss of fluoroescing ability is also undesirable because a greater quantity of porphyrin must then be used in order to achieve a required tissue delineation. Inasmuch as it appears that some patients may become photosensitive as a result of receiving hematoporphyrin and since this occurrence is probably related to dosage, it is important to maintain dosage levels at a minimum. It is also felt that the degradation products of stored hematoporphyrin when stored are undesirable for parenteral introduction into the human body.

By employing the hematoporphyrin composition of our invention, a product is achieved that is stable for a considerable period of time. Essentially, the product of our invention is produced by taking the above mentioned hematoporphyrin hydrochloride and dissolving it in a suitable alkaline aqueous solution. The solution so achieved is sterilized by filtering through a bacterial filter after which the yet active hematoporphyrin compound is reduced to the solid state by lyophilization.

The above described process is set forth in detail below with comments upon the various factors involved in the procedure.

STEP 1

3.5 gms. hematoporphyrin hydrochloride are dissolved in 100 ml. 0.24 molar sodium hydroxide using non-pyrogenic equipment and reagents.

The foregoing quantity of solvent is considered minimal, thorough solution being achieved by homogenization. The pH in the resultant solution is in the range 6.5–11.0, such being needed to achieve efficient dissolution of the hematoporphyrin hydrochloride. Resultant pH's less than 6.5 are considered unsuitable because of the decreased solubility of hematoporphyrin at acidic pH's.

It is to be noted that any base incorporating a physiologically acceptable cation can be employed in the above described solution step, as for example, potassium hydroxide or arginine. Although sodium bicarbonate has been employed in the solution step as evidenced by Cancer article noted above, we find that such a solution becomes strongly alkaline upon subsequent lyophilization (through evolution of $CO_2$), hence above the pH considered preferable by many doctors. The pH of the final product in such case is also not controllable, being dependent on the amount of $CO_2$ evolved. We prefer, therefore, to employ any non-volatile, physiologically acceptable base which does not within the pH range 6.5 to 8.5 in water form a non-dissociable complex with hematoporphyrin. Such a non-volatile base we designate in accordance with accepted nomenclature, as a fixed base.

STEP 2

The alkaline solution achieved in Step 1 is adjusted to a pH in the range 6.8 to 7.2 by the addition of hydrochloric acid.

After lyophilization, reconstitution of our hematoporphyrin product to a 0.2% solution in unbuffered aqueous media results in a pH as above, i. e., in the range 6.8 to 7.2. Such pH is considered optimal for parenteral therapy. However, Step 2 is not required if higher pH's can be tolerated in a given instance of parenteral therapy. But, under the optimal condition indicated, we consider the adjusted pH significant, so that the pH resulting from Step 1 can be in the broad range specified.

STEP 3

The physiologically acceptable solution achieved by Step 2, or the higher pH solution of Step 1, if acceptable, is then sterilized by passing through a bacterial filter such as Selas 0–2 into suitable containers.

Sterile-filtration is necessary to avoid degradative changes of hematoporphyrin as would occur during dry heat sterilization or autoclaving, both as measured fluorometrically and as judged by alteration in the spectral pattern. Whereas no loss or alteration of hematoporphyrin was encountered by passing hematoporphyrin in solution through a bacterial filter, autoclaving 0.2 to 2% aqueous solutions at 232° F. for 30 minutes resulted in immediate losses of up to 30% at pH 6.5. With 3% hematoporphyrin at pH 8.5, autoclaving destroyed 30%. Autoclaving 0.01% to 0.1% solutions at pH 1 caused almost complete disappearance of fluorescence.

Heat sterilization of dry, solid hematoporphyrin, pH 8.5 by heating at 250° F., 18 hours, produced greater than 50% loss of hematoporphyrin fluorescence.

STEP 4

The sterile solution of Step 3 is then subjected to lyophilization, i. e., evaporation of water from the solid state under conditions of reduced temperature and pressure.

Although variations of technique of lyophilization exist, they generally comprehend sublimating the solvent to achieve a dried solid. For example, we rotate the container containing the solution in a Dry-Ice bath until the solution is frozen. The container is then connected to a vacuum pump capable of achieving vacuums of the order of 29" Hg. Upon imposition of such vacuum the solvent, water in this case sublimes, drawing heat therefor from the surroundings. Upon completion of drying, the solid returns to room temperature.

During lyophilization and subsequent closure of the dosage form, sterile conditions are maintained.

The product thus achieved possesses marked fluorescence stability, there being no detectable loss of fluorescence when stored at room temperature for a least thirteen weeks at pH's of 6.5 to 7.0, and for at least thirty weeks at pH 8.5.

Contrasted to the foregoing results, storage at room temperature of aqueous solutions of hematoporphyrin rapidly deteriorate as evidenced by Table I which shows the percent loss of fluorescence as measured by a photofluorometer.

Table I

| pH | Conc., percent | Weeks Storage | | | |
|---|---|---|---|---|---|
| | | 3 | 5-7 | 16-17 | 21-28 |
| 6.0 | 0.2 | | | 50 | |
| 6.8-7.2 | 0.2 | 5-35 | 15-35 | 40-70 | 45-70 |
| 8.0-8.5 | 0.1 | 20 | | | |
| 8.0-8.5 | 2.0 | 25 | 35 | 35 | 45 |

The foregoing detailed description has been given for clearness of understanding only and no unnecessary limitations are to be inferred therefrom.

We claim:
1. A process for producing a fluorescent-stable hematoporphyrin, comprising dissolving hematoporphyrin hydrochloride in an alkali metal hydroxide having a physiologically acceptable cation, adjusting the pH of the solution so achieved to a physiologically acceptable range, sterilizing said solution at a temperature no greater than room temperature, freezing said solution, and evaporating the water therefrom under imposition of a vacuum.

2. A process for producing a solid hematoporphyrin of substantially undiminished activity for illuminating body tissues and being suitable for parenteral administration, comprising: dissolving hematoporphyrin hydrochloride in an alkali metal hydroxide having a physiologically acceptable cation to achieve a solution having a pH in the range of about 6.5 to about 11.0, filtering said solution through a bacterial filter, and removing the water from said solution under conditions of reduced temperature and pressure.

References Cited in the file of this patent

UNITED STATES PATENTS

| | | |
|---|---|---|
| 1,403,892 | Butterfield | Jan. 17, 1922 |
| 2,414,070 | Snyder | Jan. 7, 1947 |

OTHER REFERENCES

Chem. Abstracts, vol. 4, page 1193[5] (1910), citing Ber. Pharm. Ges., vol. 19, pages 284–92.